(No Model.)
W. F. JOHNSON.
CULTIVATOR.
No. 564,428. Patented July 21, 1896.
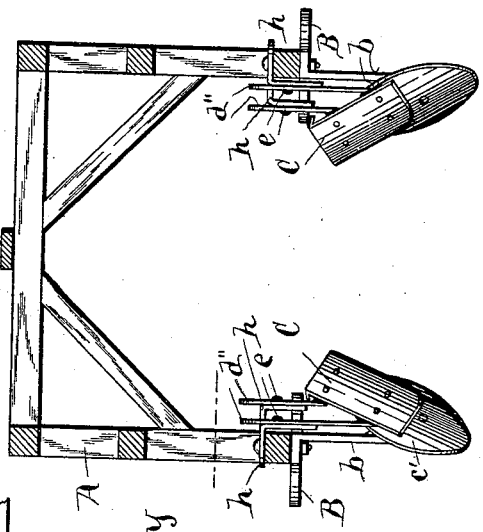
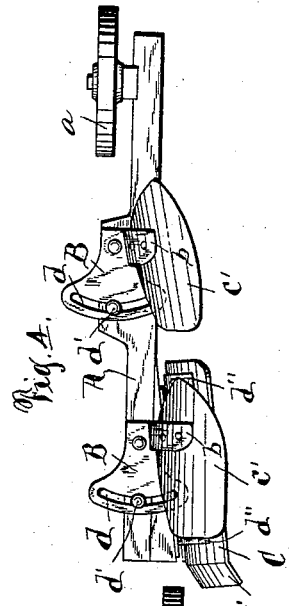
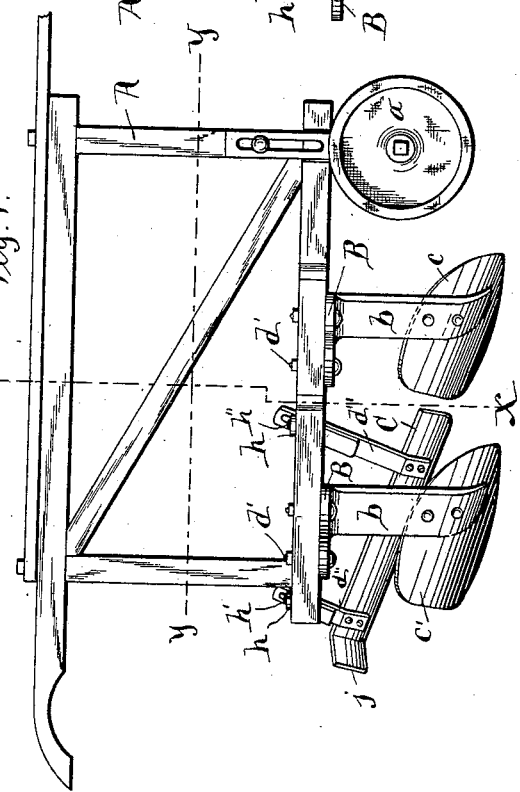
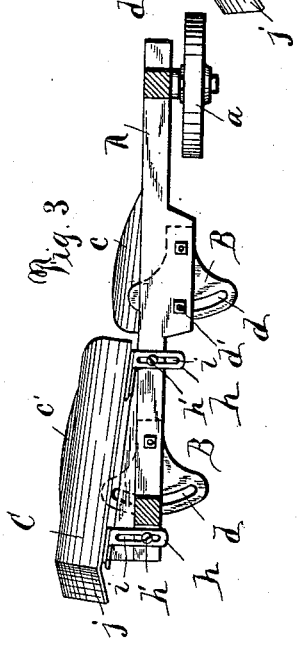
WITNESSES:
C. L. Bendixon
J. J. Laass
INVENTOR
William F. Johnson
By E. Laass
his ATTORNEY

UNITED STATES PATENT OFFICE.

WILLIAM F. JOHNSON, OF ADDISON, NEW YORK.

CULTIVATOR.

SPECIFICATION forming part of Letters Patent No. 564,428, dated July 21, 1896.

Application filed March 22, 1895. Renewed June 11, 1896. Serial No. 595,227. (No model.)

*To all whom it may concern:*

Be it known that I, WILLIAM F. JOHNSON, of Addison, in the county of Steuben, in the State of New York, have invented new and useful Improvements in Cultivators, of which the following, taken in connection with the accompanying drawings, is a full, clear, and exact description.

This invention relates to an improved construction in cultivators which are designed more especially for hilling the soil around plants.

The object of the invention is to produce a cultivator which shall be efficient in its operation on plants of different kinds, and at the same time effectually guard against covering the leaves of the plants with soil or otherwise injuring the plants; and to that end the invention consists, first, in the combination of the cultivator-frame formed with rigid parallel side beams, a plurality of single blades on each beam and inclined with their bottoms toward the central line of draft, and separate guide-rollers on the front ends of said beams whereby the cultivator is more effectually steadied in its movement, and, secondly, in the combination, with the cultivator frame and blades, of plant-guards extending along the inner sides of the upper parts of said blades and inclined forward and with their bottoms toward the center of the line of draft to pass with their flat surfaces under the overhanging branches of the plants and allow the same to slide over said surfaces of the guards while the aforesaid blades cast the soil toward the plants. The leaves and branches sliding on the flat surfaces of the guards effectually obviates undue bending, scraping, and otherwise injuring the plants.

In the annexed drawings, Figure 1 is a side elevation of a cultivator embodying my improvements. Fig. 2 is a vertical transverse section on line X X, looking toward the rear. Fig. 3 is a horizontal transverse section on line Y Y in Fig. 1, and Fig. 4 is an inverted plan view.

Similar letters of reference indicate corresponding parts.

A represents the main frame, which is formed with parallel side beams, to each of which are adjustably secured two or more single cultivator-blades $c\ c'$, disposed one back of the other, and each inclined with its bottom toward the central line of draft, so as to cause all of said blades to cast the soil toward the row of plants under the center of the cultivator. To more effectually steady the cultivator in its movement, I attach to the front end of each of the aforesaid side bars a separate guide-wheel $a$, preferably vertically adjustable according to the depth of the cutting to be made by the blades $c\ c'$. To allow said blades to be adjusted to different angles in relation to the line of draft, I pivot to the under side of the frame A standards $b\ b$, to which are secured the front and rear blades $c\ c$ and $c'\ c'$. Said legs are each formed on their upper ends with a horizontal plate B, which is pivotally secured to the under side of the frame A and provided with a segmental slot $d$ for the reception of a bolt $d'$, by which the plate is clamped in its adjusted position on the frame. The blades $c\ c'$ are thus allowed to be set to different angles in relation to the line of draft to gather more or less soil around the plants as may be desired.

In order to protect the overhanging branches and leaves from being covered by the soil cast up by the cultivator-blades, and to effect this protection without unduly bending and straining the plants or otherwise injuring the same, I extend along the inner side of each blade $c'$ a plant-guard C, consisting of an elongated board or blade, which is supported inclined longitudinally toward the front of the cultivator and also transversely with its bottom portion toward the central line of draft. This disposition of the plant-guards is one of the salient features of my invention in that the said guards are allowed to pass under the overhanging branches and leaves of the plants and gradually lift the same only sufficiently to allow them to slide over the flat surfaces of the guards without unduly disturbing the plants while the cultivator-blades cast the soil toward the plants. In order to allow said plant-guards to be adjusted for protecting plants of different kinds and sizes, I provide each of said guards with vertical attaching-arms $d''\ d''$, which are slotted vertically for the reception of their attaching-bolts $e\ e$. The guard is thus allowed to be lowered or raised according to the heights of the plants. To allow the guards to be adjusted to accommodate plants of different expanse, I make said guards adjustable laterally by attaching the arms $d''\ d''$ to downwardly-extending limbs or brackets $h\ h$, attached transversely to the frame A by bolts $h'\ h'$, passing through slots $i\ i$ in said brackets. The guards have their rear ends formed with downwardly-extending leaves $j$, which allow the plants or leaves thereof to drop gradually and thereby prevent breaking the same.

What I claim as my invention is—

1. The combination with the cultivator frame and blades inclined with their bottoms toward the central line of draft, of plant-guards extending along the inner sides of the upper parts of the aforesaid blades and inclined longitudinally toward the front and transversely toward the central line of draft to pass their flat surfaces under the overhanging branches of the plants and allow the same to slide over the said surfaces of the guards during the operation of the adjacent blades as set forth.

2. The combination, with the cultivator frame and blades, of plant-guards extending along the inner sides of the upper parts of the blades and disposed with their main portions inclined longitudinally toward the front and transversely toward the central line of draft and terminating with rearwardly-inclined rear end portions to allow the plants to gradually resume their normal shape as set forth.

In testimony whereof I have hereunto signed my name this 6th day of February, 1895.

WILLIAM F. JOHNSON. [L. S.]

Witnesses:
S. A. MINIER,
M. H. STEVENS.